United States Patent
Doong

(10) Patent No.: US 8,726,128 B2
(45) Date of Patent: May 13, 2014

(54) NON-VOLATILE MEMORY MODULE, NON-VOLATILE MEMORY PROCESSING SYSTEM, AND NON-VOLATILE MEMORY MANAGING METHOD THEREOF

(75) Inventor: Nai-Chi Doong, Taipei (TW)

(73) Assignee: Etron Technology, Inc., Hsinchu (TW)

( * ) Notice: Subject to any disclaimer, the term of this patent is extended or adjusted under 35 U.S.C. 154(b) by 188 days.

(21) Appl. No.: 13/364,329

(22) Filed: Feb. 2, 2012

(65) Prior Publication Data

US 2012/0216097 A1 Aug. 23, 2012

Related U.S. Application Data

(60) Provisional application No. 61/445,004, filed on Feb. 21, 2011.

(51) Int. Cl.
*G11C 29/00* (2006.01)

(52) U.S. Cl.
USPC .......................... 714/768; 714/763; 714/758

(58) Field of Classification Search
USPC .................. 714/768, 763, 758, 718, 802, 807
See application file for complete search history.

(56) References Cited

U.S. PATENT DOCUMENTS

| 5,745,673 | A  | * | 4/1998 | Di Zenzo et al. | 714/6.32 |
| 7,020,825 | B2 | * | 3/2006 | Watanabe et al. | 714/763 |
| 8,244,969 | B2 | * | 8/2012 | McWilliams et al. | 711/103 |
| 8,443,263 | B2 | * | 5/2013 | Selinger et al. | 714/768 |
| 2010/0169750 | A1 | | 7/2010 | Chew | |

* cited by examiner

*Primary Examiner* — Fritz Alphonse
(74) *Attorney, Agent, or Firm* — Winston Hsu; Scott Margo

(57) ABSTRACT

By using a processor to share certain burdens originally handled by a controller of a non-volatile memory module, the controller is able to process more complicated procedures. The procedures include an error correction code generating procedure, a data scrambling procedure, a data recovery procedure, an address translation procedure configured to translate a logical address into a physical address, and a wear leveling procedure.

20 Claims, 1 Drawing Sheet

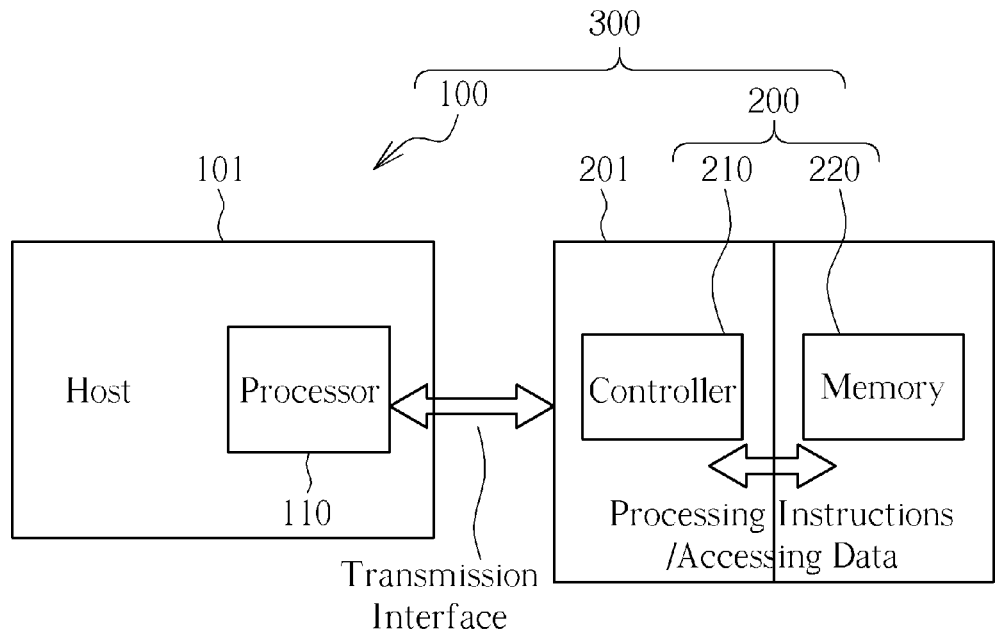

FIG. 1

A processor performs at least one of an error correction code generating procedure, a data scrambling procedure, a data restoring procedure, an address transforming procedure for transforming a logical address into a physical address, and a wear leveling procedure on data of a memory of a non-volatile memory module transmitted from a controller of the non-volatile memory module ~ 302

FIG. 2

NON-VOLATILE MEMORY MODULE, NON-VOLATILE MEMORY PROCESSING SYSTEM, AND NON-VOLATILE MEMORY MANAGING METHOD THEREOF

CROSS REFERENCE TO RELATED APPLICATIONS

This application claims priority of U.S. application Ser. No. 61/445,004 filed on Feb. 21, 2011.

BACKGROUND OF THE INVENTION

1. Field of the Invention

The present invention relates to a non-volatile memory module, a non-volatile memory processing system, and a non-volatile memory managing method thereof, and more particularly, to a non-volatile memory module, a non-volatile memory processing system, and a non-volatile memory managing method for performing procedures originally processed by a non-volatile memory module in a more efficient manner.

2. Description of the Prior Art

When a conventional non-volatile memory module is connected to a host so that the host is capable of accessing data stored in the non-volatile memory module, a controller of the non-volatile memory module is utilized for handling hardware procedures and firmware procedures of the non-volatile memory module. The hardware procedures include an error correction code generating procedure and a data scrambling procedure, and the firmware procedures include a data restoring procedure, an address transforming procedure for transforming a logical address into a physical address, and a wear leveling procedure.

However, as requirements for functionality of the non-volatile memory module increase, both the procedures handled by and the resources required by the non-volatile memory module increase. As a result, the capabilities of the non-volatile memory module in handling the abovementioned procedures are increasingly limited, and correctness of data processed by the non-volatile memory module will be significantly reduced.

SUMMARY OF THE INVENTION

The claimed invention discloses a non-volatile memory processing system. The non-volatile memory processing system comprises a non-volatile memory module and a processor. The non-volatile memory module comprises a memory and a controller. The controller is coupled to the memory for transmitting data of the memory. The processor is coupled to the controller via a transmission interface, for performing at least one of an error correction code generating procedure, a data scrambling procedure, a data restoring procedure, an address transforming procedure of transforming a logical address into a physical address, and a wear leveling procedure on the data of the memory accessed by the controller.

The claimed invention discloses a non-volatile memory module. The non-volatile memory module comprises a memory and a controller. The controller is coupled to the memory for transmitting data of the memory. An external processor is coupled to the controller via a transmission interface, and is configured to perform at least one of an error correction code generating procedure, a data scrambling procedure, a data restoring procedure, an address transforming procedure of transforming a logical address into a physical address, and a wear leveling procedure on the data transmitted from the controller.

The claimed invention further discloses a non-volatile memory managing method. The non-volatile memory managing method comprises an external processor performing at least one of an error correction code generating procedure, a data scrambling procedure, a data restoring procedure, an address transforming procedure of transforming a logical address into a physical address, and a wear leveling procedure on data of a memory of a non-volatile memory module transmitted from a controller of the non-volatile memory module.

The claimed invention further discloses a non-volatile memory managing method. The non-volatile memory managing method comprises an external processor performing an error correction code generating procedure on data of a memory of a non-volatile memory module transmitted from a controller of the non-volatile memory module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates a non-volatile memory processing system according to one embodiment of the present invention.

FIG. 2 illustrates a flowchart of a non-volatile memory managing method according to one embodiment of the present invention and descriptions related to FIG. 1.

DETAILED DESCRIPTION

Please refer to FIG. 1, which illustrates a non-volatile memory processing system 300 according to one embodiment of the present invention. As shown in FIG. 1, the non-volatile memory processing system 300 includes a non-volatile memory module 200 and a host 100. The host 100 includes a processor 110, and the non-volatile memory module 200 includes a controller 210 and a memory 220.

In the non-volatile memory module 200, the controller 210 is coupled to the memory 220 and is utilized for transmitting data of the memory 220 or for processing instructions for operating the memory 220, where operations related to the processed instructions include accessing or writing the data of the memory 220.

The processor 110 is coupled to the controller 210 via a transmission interface so that the controller 210 is capable of loading at least one device driver stored in the memory 220 into the processor 110 according to an operating system utilized by the processor 110. The transmission interface may be a USB interface, a SATA interface, or other available transmission interface in embodiments of the present invention. Therefore, the processor 110 can install the at least one device driver and run the at least one device driver by simulating a CDROM device. The at least one device driver acts as a medium for performing at least one of the error correction code generating procedure, the data scrambling procedure, the data restoring procedure, the address transforming procedure, and the wear leveling procedure.

The error correction code generating procedure is utilized for adding an error correction code to data written into the memory 220 by the host 100 when the data is written into the memory 220. Therefore, when the written data is read later, correctness of the written data can be confirmed with the aid of the added error correction code, and the written data can be restored by filtering out the error correction code.

The data scrambling procedure is utilized for scattering the data written in the memory 220 to a certain degree so as to make the written data easily stored.

The data recovering procedure includes filtering out the error correction code from the data written in the memory 220 for recovering the data, and recovering data-access procedures interrupted by accidents which affect correctness of data, such as power failures.

The address transformation is utilized for transforming a logical address set for a written datum by the host 100 into a physical address in the memory 220 when the host 100 writes the datum into the memory 220; therefore, the written datum in the memory 220 can be accessed with the aid of a correspondence between the logical address and the physical address.

The wear leveling procedure is utilized for preventing access to the memory 220 from concentrating on certain physical addresses of the memory 220, where concentration of access to the memory 220 would introduce damage earlier than expected at the certain physical addresses and shorten a life cycle of the memory 220. The purpose of the wear leveling procedure is to average the frequencies at which physical addresses are referenced by corresponding logical addresses when transforming the logical addresses into the corresponding physical addresses, so as to prevent the life cycle of the memory from being shortened.

In the present invention, the processor 110 is configured to share the burden of the controller 210 by taking over at least one procedure originally processed by the controller 210. The controller 210 is also configured to process the at least one taken-over procedure in a better manner by utilizing its resources, and as a result, defects introduced by the more complicated and advanced procedures in the processor 110 can be neutralized through aid of the controller 210.

In one embodiment of the present invention, as shown in FIG. 1, the non-volatile memory module 200 may further include a housing 201, where the memory 220 and the controller 210 are disposed inside the housing 201. The non-volatile memory processing system 300 may further include a housing 101, where the processor 110 is disposed inside the housing 101.

In one embodiment of the present invention, when the memory 220 stores a single datum, the memory 220 generates a plurality of copies of the single datum in advance and stores the plurality of copies into a plurality of least significant bit pages (LSB pages) of the memory 220. When accessing the stored datum from the memory 220, the processor 110 performs an error code recovering procedure on the plurality of copies in advance, and determines correctness of the plurality of copies according to number of occurrences of different values of the plurality of copies. In this embodiment, the correctness of the plurality of copies can be ensured with the aid of better data retention of the least significant bit pages. And, if unexpected errors occur in storing the plurality of copies in the memory 220, by examining the number of occurrences of different values in the plurality of copies, the correctness of the plurality of copies can be ensured. For example, when the value of the single datum is binary 0, the values of the plurality of copies are expected to be binary 0s as well; however, if values of part of the plurality of copies are changed to binary 1 if unexpected errors occur, as long as there are more copies having the value of binary 0 than the remaining copies having a value of binary 1, the correct value of the single datum can be determined to be binary 0 by examining the values of the plurality of copies. As a result, the correctness of the stored datum can be ensured when said stored datum is being accessed.

Please refer to FIG. 2, which illustrates a flowchart of a non-volatile memory managing method according to one embodiment of the present invention and descriptions related to FIG. 1. The non-volatile memory managing method includes steps as the following:

Step 302: The processor 110 performs at least one of an error correction code generating procedure, a data scrambling procedure, a data restoring procedure, an address transforming procedure for transforming a logical address into a physical address, and a wear leveling procedure on data of the memory 220 of the non-volatile memory module 200 transmitted from the controller 210 of the non-volatile memory module 200.

Note that embodiments generated by adding the abovementioned limitations to the step shown in FIG. 2 should also be regarded as embodiments of the present invention.

The present invention discloses a non-volatile memory processing system, a non-volatile memory module utilizing the non-volatile memory processing system, and a non-volatile memory managing method utilized by the nonvolatile memory processing system. With the aid of technical details disclosed in the present invention, a controller of the non-volatile memory module is capable of handling advanced and complicated procedures by using its own resources, such as the error correction code generating procedure, the data scrambling procedure, the data recovery procedure, the address transforming procedure, or the wear leveling procedure. Therefore, defects introduced into a non-volatile memory system by improvements of the abovementioned procedures can be overcome.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-volatile memory processing system, comprising:
a non-volatile memory module, comprising:
   a memory; and
   a controller coupled to the memory, for transmitting data of the memory; and
a processor coupled to the controller via a transmission interface, for performing at least one of an error correction code generating procedure, a data scrambling procedure, a data restoring procedure, an address transforming procedure for transforming a logical address into a physical address, and a wear leveling procedure on the data of the memory accessed by the controller.

2. The non-volatile memory processing system of claim 1 wherein the controller is further utilized for processing a command for operating the memory.

3. The non-volatile memory processing system of claim 1 wherein the controller is configured to load at least one device driver stored in the memory into the processor according to an operating system utilized by the processor; and
   wherein the processor is configured to install the at least one device driver so as to run at least one of the error correction code generating procedure, the data scrambling procedure, the data restoring procedure, the address transforming procedure for transforming the logical address into the physical address, and the wear leveling procedure.

4. The non-volatile memory processing system of claim 1, wherein the memory is configured to store a plurality of copies of a datum at a plurality of least significant bit (LSB) pages.

5. The non-volatile memory processing system of claim 4, wherein the controller is configured to load the plurality of copies into the processor; and
wherein the processor is configured to perform an error correction code restoring procedure on the plurality of copies, and is configured to determine correctness of the plurality of copies according to number of occurrences of different values of the plurality of copies.

6. The non-volatile memory processing system of claim 5, wherein the processor is configured to place a value having greatest number of occurrences among the plurality of copies as a correct value of the plurality of copies.

7. A non-volatile memory module, comprising:
a memory; and
a controller coupled to the memory, for transmitting data of the memory;
wherein an external processor is coupled to the controller via a transmission interface, and is configured to perform at least one of an error correction code generating procedure, a data scrambling procedure, a data restoring procedure, an address transforming procedure for transforming a logical address into a physical address, and a wear leveling procedure on the data transmitted from the controller.

8. The non-volatile memory module of claim 7, wherein the controller is further configured to process instructions for operating the memory.

9. The non-volatile memory module of claim 7, wherein the controller is configured to load at least one device driver stored in the memory into the external processor according to an operating system utilized by the external processor; and
wherein the external processor is configured to install the at least one device driver so as to run at least one of the error correction code generating procedure, the data scrambling procedure, the data restoring procedure, the address transforming procedure for transforming the logical address into the physical address, and the wear leveling procedure.

10. The non-volatile memory processing system of claim 7, wherein the memory is configured to store a plurality of copies of a datum at a plurality of least significant bit pages.

11. The non-volatile memory processing system of claim 10, wherein the controller is configured to load the plurality of copies into the external processor; and
wherein the external processor is configured to perform an error correction code restoring procedure on the plurality of copies, and is configured to determine correctness of the plurality of copies according to number of occurrences of different values of the plurality of copies.

12. The non-volatile memory processing system of claim 11, wherein the external processor is configured to place a value having greatest number of occurrences among the plurality of copies as a correct value of the plurality of copies.

13. A non-volatile memory managing method, comprising:
an external processor performing at least one of an error correction code generating procedure, a data scrambling procedure, a data restoring procedure, an address transforming procedure for transforming a logical address into a physical address, and a wear leveling procedure on data of a memory of a non-volatile memory module transmitted from a controller of the non-volatile memory module.

14. The non-volatile memory managing method of claim 13, further comprising:
the controller processing instructions for operating the memory.

15. The non-volatile memory managing method of claim 13, further comprising:
the controller loading at least one device driver stored in the memory into the external processor according to an operating system utilized by the external processor; and
the external processor installing the at least one device driver so as to run at least one of the error correction code generating procedure, the data scrambling procedure, the data restoring procedure, the address transforming procedure for transforming the logical address into the physical address, and the wear leveling procedure.

16. The non-volatile memory managing method of claim 13, further comprising:
the memory storing a plurality of copies of a datum at a plurality of least significant bit pages.

17. The non-volatile memory managing method of claim 16, further comprising:
the controller loading the plurality of copies into the external processor;
the external processor performing an error correction code restoring procedure on the plurality of copies; and
the external processor determining correctness of the plurality of copies according to number of occurrences of different values of the plurality of copies.

18. The non-volatile memory managing method of claim 17, wherein the external processor determining correctness of the plurality of copies according to the number of occurrences of the different values of the plurality of copies comprises:
the external processor placing a value having greatest number of occurrences among the plurality of copies as a correct value of the plurality of copies.

19. A non-volatile memory managing method, comprising:
providing a non-volatile memory module comprising a memory and a controller coupled to the memory for transmitting data of the memory;
coupling an external processor to the controller via a transmission interface;
performing, with the external processor, an error correction code generating procedure on data of the memory of the non-volatile memory module transmitted from the controller of the non-volatile memory module.

20. The non-volatile memory managing method of claim 19, further comprising:
the external processor performing at least one of a data scrambling procedure, a data restoring procedure, an address transforming procedure for transforming a logical address into a physical address, and a wear leveling procedure on the data.

* * * * *